United States Patent [19] [11] 4,182,296

Fayard [45] Jan. 8, 1980

[54] APPARATUS PERMITTING AN IMPROVEMENT OF THE CARBURETION OF INTERNAL COMBUSTION ENGINES

[75] Inventor: Jean-Claude Fayard, Lyon, France

[73] Assignee: Elf Union, Paris, France

[21] Appl. No.: 810,940

[22] Filed: Jun. 29, 1977

[30] Foreign Application Priority Data

Jul. 8, 1976 [FR] France ............................... 76 20906

[51] Int. Cl.[2] ............................................ F02M 31/00

[52] U.S. Cl. ................................ 123/122 A; 123/141; 123/122 AC; 261/144; 261/145

[58] Field of Search ......... 123/122 AB, 141, 122 AC, 123/122 A, 52 M, 122 AA, 127; 261/144, 145

[56] References Cited

U.S. PATENT DOCUMENTS

| | | | |
|---|---|---|---|
| 1,021,079 | 3/1912 | Stewart | 123/122 AB |
| 1,413,804 | 4/1922 | Snyder | 123/122 AC |
| 1,678,327 | 7/1928 | Carlston | 123/122 AC |
| 2,698,613 | 1/1955 | Jagersberger | 123/127 |
| 3,850,153 | 11/1974 | Sigwald | 123/122 AB |
| 3,972,324 | 8/1976 | Marsee | 123/122 AC |

*Primary Examiner*—Ronald H. Lazarus

[57] ABSTRACT

Apparatus permitting an improvement of the carburetion of internal combustion engines fitted downstream of a multibody carburetor and upstream of the induction manifold.

The primary homogenization chamber forming an extension of the primary body issues tangentially via an orifice into the top of the secondary homogenization chamber, namely into an annular space defined by the walls of the secondary chamber and the secondary mixture supply pipe. The secondary chamber is equipped in such a way as to form a homogenizer and to this end has fixed vanes.

Application to automobiles.

8 Claims, 9 Drawing Figures

APPARATUS PERMITTING AN IMPROVEMENT OF THE CARBURETION OF INTERNAL COMBUSTION ENGINES

BACKGROUND OF THE INVENTION

The present invention relates to an apparatus which permits an improvement to the carburetion of internal combustion engines and which is fitted between a multi-body carburettor and the induction manifold of an internal combustion engine.

Such an apparatus serves to improve the carburetion of internal combustion engines by increasing the homogeneity of the air/gasoline mixture supplying the various cylinders, thus ensuring a better distribution of this mixture and consequently permitting a sufficient reduction in the richness of the mixture to bring about a significant reduction of unburnt material, hydrocarbons and carbon-monoxide as well as a significant decrease in the specific consumption.

In the case of mutli-cylinder engines supplied by a carburettor, studies have shown that the composition of the mixture which effectively supplies each cylinder is subject to significant differences compared with the composition of the mixture from the carburettor. These differences are mainly due to the heterogeneity of the mixture from the carburettor, the flow being of the two-phase type with a liquid phase and a gaseous phase whereby during its transfer into the induction manifolds the bends and different configurations of the latter aid a segregation of the suspended droplets, thus contributing to the formation of a liquid film flowing in an uncertain manner. All these phenomena have the effect of causing significant differences in richness between the mixture which actually enters each cylinder and that which leaves the carburettor. Moreover, it is known on an experimental basis that the mixture supplying a cylinder must have a minimum richness to function normally. This richness R is often called "the richness limit for stable operation" and has for its minimum value with commercial gasoline: $R=0.70$ $$\text{Richness} = \frac{\text{Stoichiometric ratio of air to fuel}}{\text{Ratio of air to fuel actually contained in the mixture}}$$

This minimum richness increases at partial loads because under these conditions the dilution of the mixture carburetted by the residual exhaust gases becomes larger.

Thus, in the case of multi-cylinder engines supplied by a carburettor the mixture from the latter must have a richness which is sufficient to enable the cylinder receiving the least rich mixture to have a richness which exceeds the "richness limit for stable operation". Thus, any distribution fluctuation makes it necessary to regulate the complete engine assembly relative to the least rich cylinder and experience has shown that with conventional induction manifolds it is not possible to sufficiently reduce the richness of the mixture to obtain significant reductions of unburned pollutants, hydrocarbons and carbon-monoxide.

Many processes have been proposed for solving this problem.

According to certain processes the intake manifold is heated by the exhaust gases to bring about the vaporisation of the gasoline which streams down, thus improving the distribution.

According to other processes, baffles or deflectors are located in tanks heated directly or indirectly by exhaust gases in order to firstly separate the non-vaporised fractions and secondly their vaporisation.

These processes improve the distribution of the mixture to the different cylinders under stable operating conditions but their design is such that they lead to latent delivery defects under transient operating conditions, e.g. acceleration and deceleration, as well as to serious difficulties during starting and cold operation. The described processes and apparatuses have in fact either hollows or tanks in which the fuel tends to concentrate during cold starts and accelerations, thus causing a sudden reduction in the richness of the mixture which is prejudicial to the good operation of the engine.

Moreover, the design of the apparatuses used for applying these processes is such that during its passage into the inside thereof the mixture undergoes a significant temperature rise, thus causing a decrease in the mass filling of the engine at full load, resulting in a power loss. This power loss is increased through these systems having high pressure drops for the mixture flows required for full load.

To illustrate the prior art, reference is made to the following patents in their chronological order of filing which relate to processes having one or more of the defects indicated hereinbefore.

U.S. Pat. No. 1,490,921(1924), describes a system in which the air/fuel mixture from the carburettor undergoes a complete change in direction relative to a spherical plate heated by the exhaust gases. This system has a hollow and leads to an excessive temperature of the mixture.

French Pat. No. 807,185(1936) describes a system in which the air/fuel mixture from the carburettor is rotated by a baffle in the form of an endless screw in such a way that heavy particles are projected and directed into channels heated by the exhaust gases. The presence of hollows leads to an instantaneous reduction in the richness of the mixture during acceleration.

French Pat. No. 955,606(1947) describes a system in which the air/fuel mixture from the carburettor is rotated in the same way as in the previously mentioned patent but both the walls and baffle are kept at a relatively high temperature by the exhaust gases and a tank is provided for storing the non-vaporised portion. The apparatus has hollows and heats excessively the carburetted mixture.

U.S. Pat. No. 3,146,768(1964) describes an apparatus comprising a so-called pre-induction chamber located downstream of a carburettor in which a certain volume of exhaust gases is added to the mixture and the resulting mixture is given several complete direction changes by baffles which locally give the mixture a centrifugal movement. In view of its design, this apparatus has numerous hollows in which the fuel is concentrated and which can be associated with a tank for storing the fuel. This apparatus causes an excessive pressure loss at full load.

U.S. Pat. No. 3,421,313(1974) describes an apparatus similar to that described in U.S. Pat. No. 3,146,768. The mixture is centrifugally displaced by the introduction of exhaust gases and by the baffle. As in the previously mentioned patent, this apparatus has a hollow.

U.S. Pat. Nos. 2,259,993 and 2,259,995(1975) describe an apparatus in which the mixture undergoes at least one complete direction change with the object of bringing about the impact of the non-vaporised fractions on a heated plate. Impact takes place in a so-called hot box of small dimensions. Another important characteristic in combination with the main constructional principle is to provide the discharge apperture of the box in the pipe of the induction manifold at a point which is axially aligned with that where the secondary body of the carburettor supplies the induction manifold.

In view of its design, this apparatus has a hollow which causes no delivery defect for transient operating conditions but which can cause problems during starts at low temperature and with a cold engine.

Reference is finally made to French Patent Application No. EN 7434012 entitled "Process and apparatus permitting an improvement of the carburetion of internal combustion engines" filed in the name of the present Applicant which describes a process comprising directing the heterogeneous air/gasoline mixture leaving the carburettor to at least one centrifugal separator or cyclone in which the gasoline droplets undergo a centrifugal movement, the walls of the cyclone are heated so as to cause the vaporisation of part of the droplets, the remaining droplets are collected in a collecting chamber directed towards a vaporiser or the fuel tank, forced back into the mixing circuit and the thus homogenised gas is delivered to the combustion chamber.

The apparatus used for applying this process comprises at least one homogeniser for connection downstream to a carburettor, and upstream to the combustion chamber, whereby the homogeniser is a cyclone having an intake pipe for the air/gasoline mixture from the carburettor, a mixing cone having, for example, fixed vanes which gives a centrifugal movement to the air/gasoline mixture, a discharge pipe for said mixture issuing into the combustion chamber, a collecting chamber in which are collected the non-vaporised gasoline droplets, a pipe for transferring the gasoline droplets to a vaporiser and a pipe for transferring the vaporised gasoline into the air/gasoline mixture circuit.

Finally, according to the First Certificate of Addition No. EN 75 23354 the above apparatus was improved by modifying the cyclone in such a way that it has no obstacle which can oppose the direct flow of the air/gasoline mixture to the induction manifold, so that it has no hollow and in addition the cyclone is externally heated in such a way as to ensure the complete vaporisation of the droplets.

BRIEF SUMMARY OF THE INVENTION

The present invention has for its object an apparatus permitting an improvement in the carburetion of internal combustion engines fitted downstream of a multibody carburettor and upstream of the induction manifold, said multibody carburettor comprising at least one primary body for forming a primary air/fuel mixture and at least one secondary body for forming a secondary air/fuel mixture when the engine is under full load, wherein it substantially comprises primary and secondary homogenisation chambers surrounded by a heating fluid and which are respectively fitted to the primary and secondary bodies, whereby each primary homogenisation chamber is equipped with a mixing cone giving the mixture a centrifugal movement and issuing into the top of a secondary homogenisation chamber. As a result, the mixture directed to the induction manifold is very homogeneous.

According to a preferred embodiment of the invention, the secondary homogenisation chamber comprises a cylindrical chamber to which the secondary mixture is supplied at the top and in the centre by means of a pipe, whereby the outlet from the primary homogenisation chamber issues tangentially into the annular space defined by the walls of the cylindrical chamber and the secondary mixture supply pipe, whereby the resulting homogeneous mixture is directed to the induction manifold by an outlet located at the bottom of said secondary homogenisation chamber.

According to another embodiment, the primary homogenisation chamber has two discharge pipes issuing tangentially in the top of the secondary chamber into the annular space, but in diametrically opposite areas. These two discharge pipes can also issue into the top of the secondary chamber by converging into the same area.

As a variant, the outlet of the primary chamber issues into the annular space in the top of the secondary homogenisation chamber, whereby said annular space has a constriction in the form of a venturi level with the discharge point of the secondary mixture supply pipe.

It should be noted that the walls of the primary and secondary homogenisation chambers are in contact with an enclosure heated by an engine-cooling fluid or by exhaust gases.

The centrifugal movement in the primary homogenisation chamber can be produced by fixed vanes having an aerodynamic profile inclined by 60° or by the mixture being supplied by pipes positioned tangentially to the cylindrical chamber.

As a result of the use of such an apparatus, a remarkable distribution of the mixture is obtained under all operating conditions, which makes it possible to supply the engine at partial loads with mixtures which are of a sufficiently reduced richness to bring about a significant reduction in the emission of hydrocarbons and carbonmonoxide as well as a significant reduction of the specific fuel consumption. Under full load conditions this better distribution leads to a power gain which is of great interest under low running conditions.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof, and what are now considered to be the best modes contemplated for applying these principles. Other embodiments of the invention embodying the same or equivalent principles may be used and structural changes may be made if desired by those skilled in the art without departing from the invention and the scope of the appended claims. In the drawings show:

DETAILED DESCRIPTION OF THE PREFERRED EMBODIMENTS

Figure 1:
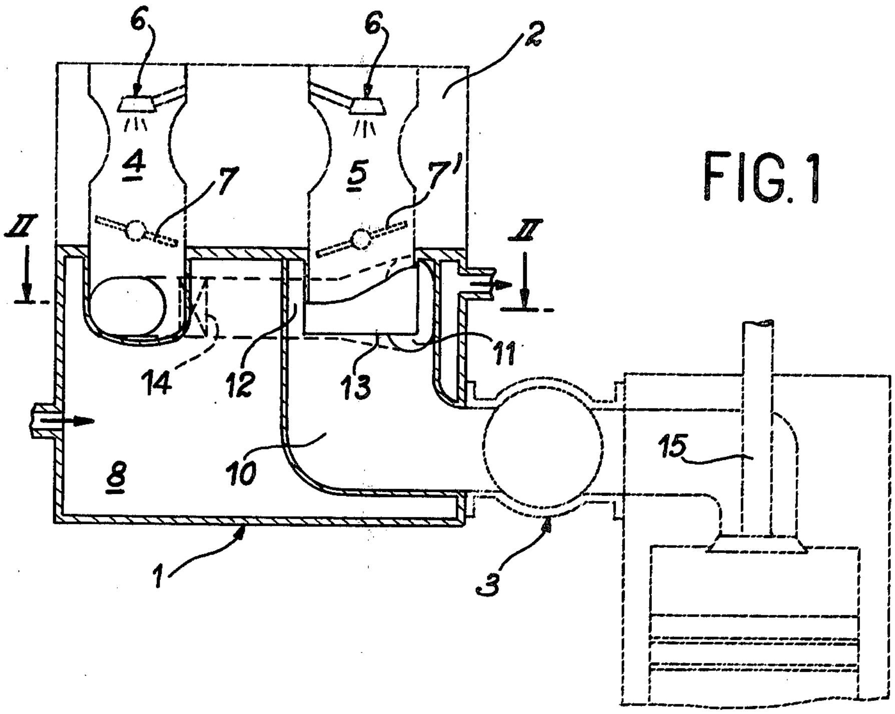
FIG. 1, a first embodiment of the apparatus fitted to a double-body carburettor.

FIG. 1 shows an apparatus 1 according to the invention fitted downstream of a carburettor 2 and upstream of the induction manifold 3 of an internal combustion engine.

Carburettor 2 is a double-body carburettor comprising a primary body 4 and a secondary body 5, each equipped with a jet 6 and 6' and a butterfly valve 7 and 7', whereby butterfly valve 7' only opens when the engine is operating at full load with a view to permitting the entry of the secondary air/fuel mixture.

A heating fluid from the radiator or exhaust gases circulates in enclosure 8 and heats primary homogenisation chamber 9 and secondary homogenisation chamber 10 which are respectively supplied by body 4 and secondary body 5.

Figure 2:
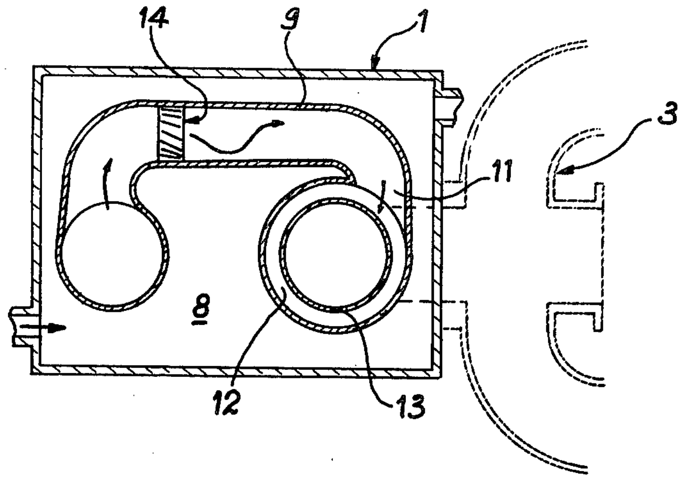
FIG. 2, a section along the line II—II of FIG. 1.

More particularly, and as can also be seen in FIG. 2, homogenisation chamber 9 which extends the primary body issues into the top of homogenisation chamber 10 tangentially orifice 11 into an annular space 12 defined by the walls of secondary chamber 10 and the supply pipe 13 for the secondary mixture. Chamber 9 is equipped in such a way as to constitute a homogeniser and to this end has inclined fixed vanes 14 which give a centrifugal movement to the primary mixture. As in addition the homogeniser walls are heated the droplets of the mixture coming into contact with the walls are vaporised and re-entrained by the intense centrifugal movement in the enclosure. This provides better conditions for obtaining a homogeneous mixture. This mixture passes out of the primary chamber via orifice 11, passes into secondary chamber 10 for admission into the induction manifold 3 and then into the cylinders by opening a valve such as 15.

It is clear that by opening butterfly valve 7' the secondary mixture from secondary body 5 enters the secondary homogenisation chamber 10 via pipe 13 and encounters the primary homogenised mixture from orifice 11 which gives it its own centrifugal movement. Thus, this assists a vigorous mixing of the secondary mixture with the primary mixture in chamber 10, making it possible to obtain a final homogeneous mixture even under full load conditions.

The dimensions of the apparatus are greatly dependent on the power and cubic capacity of the engine on which it is mounted. Good results have been obtained on a 1300 cc. engine with an apparatus having the following dimensions and characteristics. The homogeniser tube fitted to the length of the primary body has a diameter of 25 mm and a length of 75 mm. The fixed vanes comprise a helix whose blades have an aerodynamic profile and are inclined by 60° in such a way as to give the mixture a minimum centrifugal speed of 15 m/s in slow motion. The diameter of cavity 12 and chamber 10 is 40 mm and the height 60 mm, whilst the two carburettor bodies have a diameter of 32 mm. The orifice 11 which causes the centrifugal movement relative to the second body has a surface area of 7 $cm^2$ and the tube 13 which supplies the secondary mixture to chamber 10 has a diameter of 32 mm and a height of 20 mm.

In order to obtain good results, it is indispensable to have on the homogeniser equipping the primary chamber centrifugal speeds of the mixture exceeding 10 m/s.

The centrifugal speed relative to the secondary body produced by the passage of the primary mixture to orifice 11 has an influence on the maximum power. Thus, if the centrifugal speed is too high the power gain which should be obtained by a better distribution is in part compensated by the resulting pressure loss.

Figure 3:
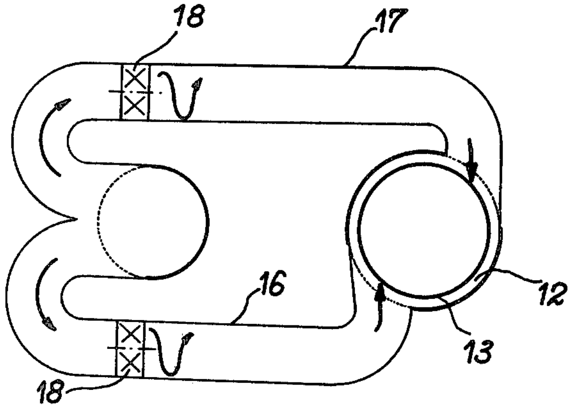
FIG. 3, a diagrammatic representation of the apparatus fitted to a carburettor whose primary chamber has two discharge pipes issuing tangentially into the top of the secondary chamber.

In the variant shown in FIG. 3 it can be seen that the primary body no longer supplies one but two primary homogenisers 16 and 17 each of which has fixed vanes 18. Homogenisers 16 and 17 issue into chamber 10 at diametrically opposite points in annular space 12. This leads to a centrifugal movement created by these two intakes leading to a good homogenisation of the total mixture when the secondary mixture is admitted.

Figure 4:
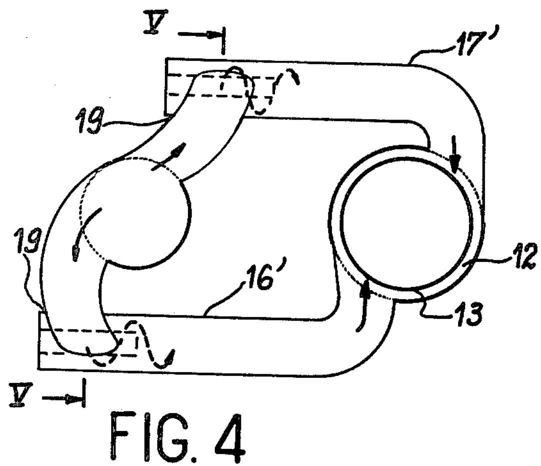
FIG. 4, a variant of FIG. 3 whereby the centrifugal movement in the primary chambers is produced by a tangential supply of the mixture to the chambers.
Figure 5:
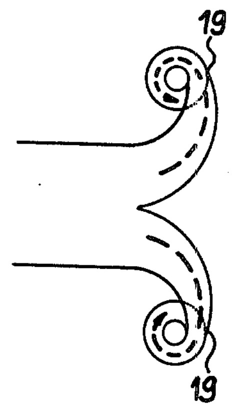
FIG. 5, a section along the line V—V of FIG. 4.

The apparatus shown in FIGS. 4 and 5 is identical to that described hereinbefore but the centrifugal movement in the primary homogenisation chambers 16' and 17' is produced by the tangential supply of the primary mixture by tubes 19.

Figure 6:
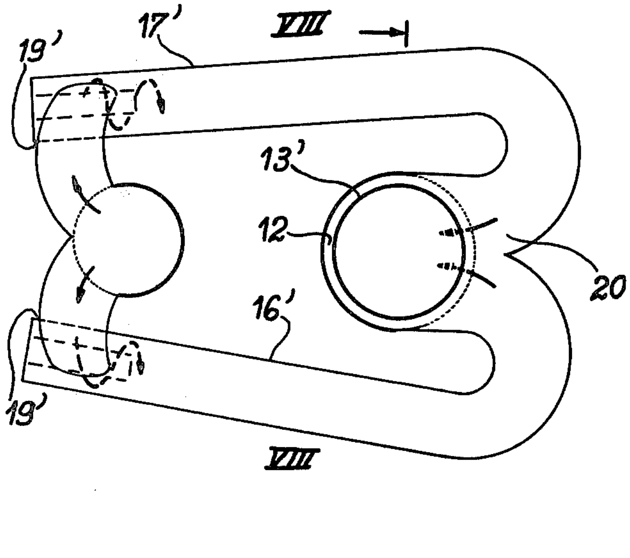
FIG. 6, a second embodiment of the apparatus.
Figure 7:
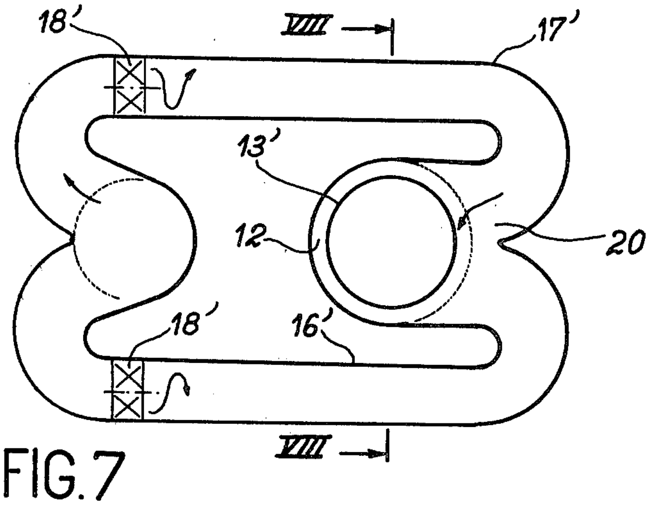
FIG. 7, a variant of FIG. 6, the centrifugal movement being produced by a tangential supply in the primary chambers.
Figure 8:
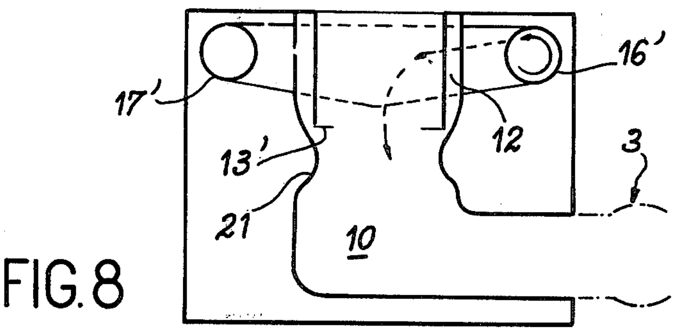
FIG. 8, a section along the line VIII—VIII of FIGS. 6 and 7.

The apparatus is shown in a further variant in FIGS. 6, 7 and 8.

Homogenisation in primary chambers 16' and 17' is produced:

In FIG. 6 in the same way as on the apparatus shown in FIG. 4, i.e. by a tangential supply of the primary mixture at 19'.

In FIG. 7 in the same way as in the apparatus shown in FIG. 3 i.e. by fixed vanes 18' but the difference relative to the variant of FIG. 3 is that the primary homogenised mixture is no longer tangentially admitted into the annular space of secondary chamber 10 but is simply admitted into the annular space by a common or non-common pipe 20, homogenisation of the total mixture being obtained by accelerating the primary mixture relative to the venturi-shaped nozzle 21, thus bringing about a good homogenisation of the secondary mixture issuing at 13' level with nozzle 21.

Figure 9:
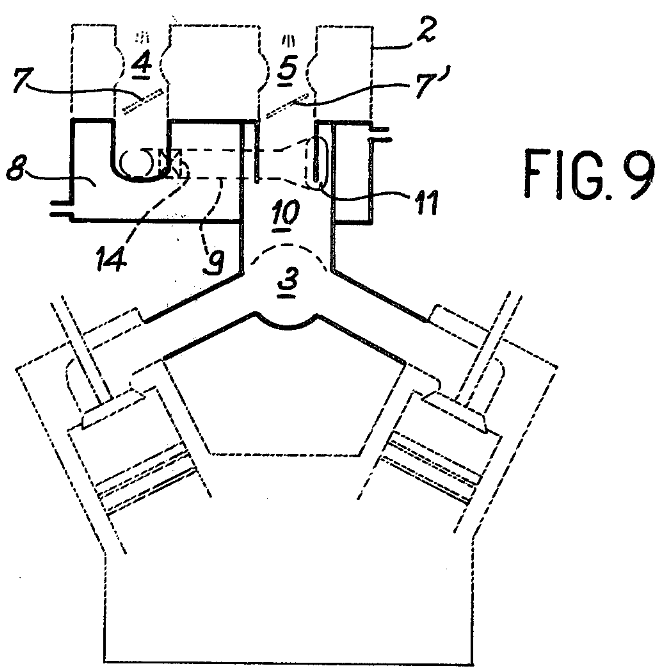
FIG. 9, the fitting of an apparatus according to the first embodiment on an engine with a V-type cylinder configuration.

FIG. 9 shows an installation of an apparatus of the same type as that shown in FIGS. 1 and 3 on an engine with a V-shaped cylinder configuration. As can be seen, the induction manifold 3 can advantageously be located in the axis and the bottom of the secondary chamber 10.

Tests showing the significance of the apparatus have been performed in the following manner:

The true distribution of the air/fuel mixture from the carburettor was measured on the various cylinders of a four-cylinder engine of a Renault 12TS automobile (1300 cc.) The engine was equipped with an intake system identical to that shown in FIGS. 1 and 2 and the centrifugal speed of the mixture from the primary body in slow motion was 15 m/s.

Heating was provided by tapping the exhaust gases.

The mixture distribution was also measured with prior art equipment and it was found that in this case significant distributions of variations occurred, whereas with the apparatus according to the invention the distribution variations were below 10% no matter what the operating conditions. The results of the tests appear in the following table:

| | Prior art carburettor Richness of the mixture | | | | | Carburettor equipped with the apparatus Richness of the mixture | | | | |
|---|---|---|---|---|---|---|---|---|---|---|
| Cylinders | No. 1 | No. 2 | No. 3 | No. 4 | Δ R | No. 1 | No. 2 | No. 3 | No. 4 | Δ R |
| Slow motion | 0.995 | 0.98 | 0.95 | 0.89 | 0.105 | 0.96 | 0.98 | 0.98 | 0.975 | 0.02 |
| 37 km/h | 1.15 | 1.10 | 1.06 | 1.01 | 0.14 | 0.97 | 0.98 | 0.98 | 0.975 | 0.01 |
| 53 km/h | 1.035 | 0.985 | 1.00 | 0.99 | 0.04 | 0.905 | 0.915 | 0.905 | 0.90 | 0.015 |
| 77 km/h | 0.97 | 1.00 | 0.97 | 0.95 | 0.05 | 0.915 | 0.915 | 0.915 | 0.915 | 0.00 |
| 105 km/h | 0.97 | 1.07 | 1.02 | 0.94 | 0.13 | 0.95 | 0.945 | 0.95 | 0.945 | 0.005 |
| 133 km/h | 1.12 | 1.24 | 1.13 | 0.86 | 0.40 | 0.95 | 0.96 | 0.95 | 0.95 | 0.01 |

R=maximum richness difference between the least rich cylinder and the richest cylinder.

These measurements show a good distribution resulting from the excellent homogeneity of the mixture supplied by the apparatus. This good distribution is of interest because, as indicated at the start of the text any variation in the distribution makes it necessary to regulate the carburettor relative to the cylinder receiving the least rich mixture.

Thus, with the apparatus according to the invention it is possible to reduce the richness of the mixture whilst still keeping far enough away from the richness limit of stable operation of the engine.

The Renault 12 TS automobile equipped with the apparatus underwent the test according to European procedure and according to U.S. Federal procedure 76.

The European procedure is a standard test on vehicles which establishes numerous operating conditions in accordance with a cycle representative of the traffic conditions within European cities.

U.S. Federal procedure 1976 is a standard test for vehicles of the same type as the European procedure but the operating conditions of the vehicle are established according to a cycle representative of traffic conditions both within and outside cities in the U.S.A.

| According to the European procedure: | CO | Hydrocarbons | Consumption |
|---|---|---|---|
| 1976 Legislation corresponding to standard emissions of vehicles of the same type as the Renault 12 TS | 107 to 129 g/test | 8 to 10.4 g/test | |
| Standard R 12 TS | 87 g/test | 5 g/test | 10.2 1/100 km |
| R 12 TS equipped with the apparatus | 13 g/test | 2.1 g/test | 9.5 1/100 km |

| According to U.S. Federal Procedure 1976 CVS - CH: | CO | Hydrocarbons | NOx | 1/100 km |
|---|---|---|---|---|
| Emission Standard | 15 g/mile | 1.5 g/mile | 3.1 g/mile | |
| Standard R 12 TS | 24 g/mile | 2.4 g/mile | 2.5 g/mile | 9.3 |
| R 12 TS equipped with the apparatus | 5.4 g/mile | 1.7 g/mile | 2.6 g/mile | 7.7 |

1 mile = 1.6093 km.

It can be seen that in these two series of tests the apparatus causes a significant reduction of carbon-monoxide and hydrocarbon emission without significantly increasing the NOx emission.

Consumption is improved by 7% for the European cycle and more than 10% for the U.S. cycle.

It is found that starting with a vehicle having a particularly high pollution level according to the U.S. cycle the fitting of the apparatus makes it possible to follow the standard without using a costly catalyst, except in the case of hydrocarbons.

Under stable operating conditions this apparatus permits consumption reductions of the order of 10%, as in the case of transient operating conditions.

| | Standard Vehicle | Vehicle Equipped with Apparatus |
|---|---|---|
| 40 km | 4.8 1/100 km | 4.0 1/100 km |
| 60 km | 5.4 1/100 km | 4.7 1/100 km |
| 90 km | 7 1/100 km | 6.3 1/100 km |
| 120 km | 9.4 1/100 km | 8.6 1/100 km |

Under full load conditions and when equipped with the apparatus, significant power increases under low running conditions up to 3500 r.p.m. were obtained due to a better distribution of the mixture. By adopting a lower centrifugal speed relative to the chamber to which the secondary mixture is supplied, it is possible to obtain a power increase for higher operating conditions. The test results appear in Table II:

Table II

| Operating conditions | Standard vehicle | Equipped vehicle | Power increase |
|---|---|---|---|
| r.p.m. | HP | HP | HP |
| 1500 | 13.9 | 15.4 | + 10.8% |
| 2000 | 19.2 | 21.4 | + 11.4% |
| 2500 | 26 | 27.9 | + 7.3% |
| 3000 | 33.1 | 35 | + 5.7% |
| 3500 | 40 | 41 | + 2.5% |

(The power figures are measured on the rim in horse power).

The invention is not limited to the embodiments described and represented hereinbefore and various modifications can be made thereto without passing beyond the scope of the invention.

What is claimed is:

1. An apparatus for improvement in the carburetion of internal combustion engines adapted to be connected to the downstream end of a multibody carburetor comprising at least one primary body for forming a primary air/fuel mixture and at least one secondary body for forming a secondary air/fuel mixture when the engine is under full load, said apparatus comprising a body forming primary and secondary homogenization chambers connected respectively to said primary and secondary bodies, said primary homogenization chamber being connected to the top of said secondary homogenization chamber, a housing substantially surrounding said primary and secondary chambers and adapted to receive a heating fluid, each primary homogenization chamber being equipped with means for giving the mixture a centrifugal movement as it passes through said primary homogenization chamber and into said secondary homogenization chamber.

2. An apparatus according to claim 1, wherein the secondary body is connected to the secondary chamber via a pipe which forms an annular space with the wall of the secondary chamber.

3. An apparatus according to claim 1, wherein the primary chamber is connected tangentially into the top of the secondary chamber.

4. An apparatus according to claim 1, wherein the primary chamber has two discharge pipes which connect tangentially into the top of the secondary chamber in diametrically opposite areas.

5. An apparatus according to claim 1, wherein the primary chamber has two discharge pipes which lead into the top of the secondary chamber and converge on the same area.

6. An apparatus according to claim 1, wherein the connection between the secondary carburetor body and the secondary homogenization chamber is a pipe and the body forming said secondary homogenization chamber forms together with said pipe a venturi-shaped constriction for delivering said primary mixture to said secondary homogenization chamber.

7. An apparatus according to claim 1 wherein the primary homogenisation chambers comprise cylindrical tubes at the intakes of which are provided fixed vanes which are inclined at an angle of about 60° to give a centrifugal movement to the mixture.

8. An apparatus according to claim 1, wherein the primary homogenisation chambers comprise cylindrical tubes, at the intakes of which tangential supply means is provided for giving the mixture a centrifugal movement.

* * * * *